United States Patent
McCabe et al.

(10) Patent No.: US 10,954,433 B2
(45) Date of Patent: Mar. 23, 2021

(54) METHODS AND SYSTEMS FOR PREPARING PROPPANT SLURRIES

(71) Applicant: Halliburton Energy Services, Inc., Houston, TX (US)

(72) Inventors: Michael A. McCabe, Duncan, OK (US); Stanley C. Combs, Comanche, OK (US); Paul Lewis Mendenall, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/649,470

(22) PCT Filed: Nov. 14, 2017

(86) PCT No.: PCT/US2017/061451
§ 371 (c)(1),
(2) Date: Mar. 20, 2020

(87) PCT Pub. No.: WO2019/098987
PCT Pub. Date: May 23, 2019

(65) Prior Publication Data
US 2020/0299572 A1 Sep. 24, 2020

(51) Int. Cl.
*E21B 43/267* (2006.01)
*C09K 8/80* (2006.01)

(52) U.S. Cl.
CPC .............. *C09K 8/80* (2013.01); *E21B 43/267* (2013.01)

(58) Field of Classification Search
None
See application file for complete search history.

(56) References Cited

U.S. PATENT DOCUMENTS

| | | |
|---|---|---|
| 3,563,517 A | 2/1971 | Harriman |
| 4,158,150 A | 6/1979 | Smith et al. |
| 5,046,855 A | 9/1991 | Allen et al. |
| 5,538,341 A | 7/1996 | Padgett et al. |
| 7,703,518 B2 | 4/2010 | Phillippi et al. |

(Continued)

OTHER PUBLICATIONS

International Search Report and Written Opinion issued in related PCT Application No. PCT/US2017/061451 dated Jul. 26, 2018, 18 pages.

(Continued)

*Primary Examiner* — Andrew Sue-Ako
(74) *Attorney, Agent, or Firm* — Thomas Rooney; Baker Botts L.L.P.

(57) ABSTRACT

Methods and systems for preparing slurries for treating subterranean formations are provided herein. The methods may include: combining proppant particulates and a base fluid at a well site to form a slurry; and extracting dust from a mixing tank at a well site in which the slurry is disposed. The systems may include: a first tank containing proppant particulates located at a wellsite; a second tank containing a base fluid located at a well site; at least one mixer operable to receive and mix at least a portion of the proppant particulates from the first tank and at least a portion of the base fluid from the second tank at the well site to form a slurry; at least one mixing tank operable to receive the slurry from the mixer; and at least one dust extractor operable to extract dust from the at least one mixing tank.

18 Claims, 3 Drawing Sheets

(56) References Cited

U.S. PATENT DOCUMENTS

| | | |
|---|---|---|
| 9,115,557 B1 | 8/2015 | Ortowski et al. |
| 9,630,223 B1 | 4/2017 | Smith |
| 2005/0055162 A1* | 3/2005 | Gao ........................ G01V 1/22 |
| | | 702/2 |
| 2007/0000666 A1* | 1/2007 | Vozniak ................ E21B 43/267 |
| | | 166/308.1 |
| 2013/0213647 A1 | 8/2013 | Roddy et al. |
| 2013/0309052 A1 | 11/2013 | Luharuka et al. |
| 2015/0083426 A1* | 3/2015 | Lesko .................... E21B 17/00 |
| | | 166/308.1 |
| 2015/0337620 A1 | 11/2015 | Fonseca Ocampos et al. |
| 2016/0280480 A1* | 9/2016 | Smith .................. E21B 43/267 |

OTHER PUBLICATIONS

Rassenfoss, Stephen, "Seeking Big Oil Production Gains by Fracturing with Microproppant", Mar. 1, 2017, found at https://pubs.spe.org/en/jpt/jpt-article-detail/?art=2715, 8 pages.

\* cited by examiner

METHODS AND SYSTEMS FOR PREPARING PROPPANT SLURRIES

CROSS-REFERENCE TO RELATED APPLICATION

The present application is a U.S. National Stage Application of International Application No. PCT/US2017/061451 filed Nov. 14, 2017, which is incorporated herein by reference in its entirety for all purposes.

BACKGROUND

The present disclosure relates to methods and systems for treating subterranean formations.

Wellbores are drilled into the earth for a variety of purposes including tapping into hydrocarbon bearing formations to extract the hydrocarbons for use as fuel, lubricants, chemical production, and other purposes. Hydrocarbon producing wells can be stimulated using fracturing treatments. In a typical hydraulic fracturing treatment, a fracturing fluid is pumped through a wellbore and into a subterranean formation producing zone at a rate and pressure such that one or more fractures are formed or extended into the zone.

Hydraulic fracturing treatments may produce primary fractures in the near field around the well bore, as well as induced, dendritic fractures in the far field extending from the primary fractures. These induced, dendritic fractures are generally formed at the tip and edges of the primary fractures, and extend outwardly in a branching tree like manner from the primary fractures, creating a complex fracture network. The complex fracture network encompasses the primary fracture and any and all branching fractures (e.g., secondary branch fractures, tertiary branch fractures, etc.), regardless of their size, man-made or otherwise, within a subterranean formation that are in fluid communication with the wellbore. Because secondary dendritic fractures can extend transversely to the trajectory of the primary fractures, they reach and link natural fractures both in and adjacent to the trajectory of the primary fractures. As such, secondary fractures reach a larger portion of the naturally occurring fracture network, and link the natural fractures back to the primary fractures and the wellbore. Accordingly, communication between the primary fracture and the remainder of the corresponding complex fracture network may be an important factor in maximizing production from the formation.

Fracturing treatment fluid may also function as a carrier fluid that transports solids to a target area. For example, particulate solids, also known as "proppant particulates," "proppants," or "particulates," may be suspended in a portion of the fracturing fluid and transported to a fracture. The suspended particulates are deposited in the fractures so as to prevent the fractures from fully closing once the hydraulic pressure is removed. By keeping the fractures from fully closing, the proppant particulates aid in forming conductive channels through which produced hydrocarbons can readily flow. Accordingly, proppant particulates hold the complex fracture network open, thereby maintaining the ability for hydrocarbons to flow through the complex fracture network to ultimately be produced at the surface.

The generation of dust may occur during storage, transportation, and application of certain particulate solids. Therefore, the delivery of particulate solids to the well site in the form of a liquid concentrate proppant slurry that include a suspension agent is often desirable. The delivery of the liquid concentrate proppant slurry to the well site often requires specialized transportation and storage containers. Additionally, degradation of the suspension agent and/or settling of proppant in the liquid concentrate proppant slurry may occur during storage and transportation of the liquid concentrate proppant slurry.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for preparing slurries comprising proppant particulates that may be use in treatment fluids for treating subterranean formations.

The present disclosure provides systems for preparing proppant slurries and treatment fluids including the proppant slurries that comprise at least a first tank containing proppant particulates, at least a second tank containing a base fluid, at least one mixer, at least one mixing tank, and at least one dust extractor. In certain embodiments, the methods of the present disclosure may include combining the proppant particulates from the first tank and the base fluid from the second tank in the mixer to form a slurry. In certain embodiments, the dust extractor may remove or extract dust from the mixing tank that is generated from the proppant particulates when the slurry is transferred to or disposed within the mixing tank. In certain embodiments, the dust extractor generally may comprise any device that causes negative pressure or suction (e.g., a fan, a pump, a diaphragm device, a screw, a piston compressor, and the like) to aid in the extraction or removal of dust from mixing tank. In some embodiments, the slurry may be transferred from the mixing tank to at least one blender wherein the slurry may be incorporated into a treatment fluid. In certain embodiments, the treatment fluid may be introduced into a wellbore penetrating at least a portion of a subterranean formation.

Among the many potential advantages to the systems and methods of the present disclosure, only some of which are alluded to herein, the systems and methods of the present disclosure may facilitate the preparation of proppant slurry at a well site by minimizing dust generated by the proppant particulates during the preparation of the proppant slurry.

The systems and methods of the present disclosure may eliminate the need to transport the heavy proppant slurry to the well site and/or to use specialized totes for storing or transporting the proppant slurry. In certain embodiments, the systems and methods of the present disclosure also may reduce the length of time for which the proppant slurry must be stored (e.g., for transportation) which in turn may reduce or eliminate problems associated with storing the proppant slurry, such as degradation of a suspension agent in the proppant slurry, settling of the proppant particulates in the proppant slurry, and/or freezing of the proppant slurry in cold conditions.

Figure 1:
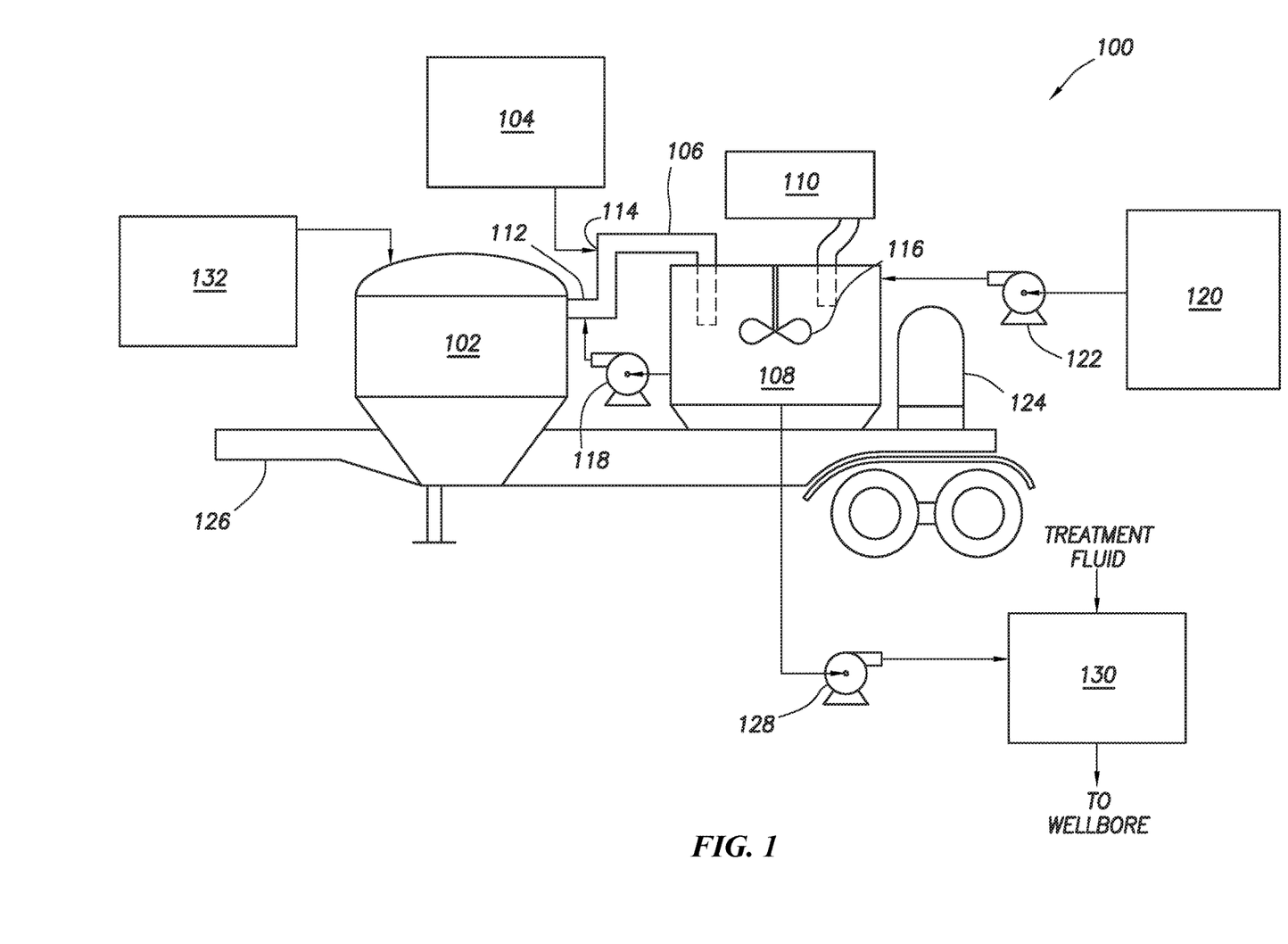
FIG. 1 is a schematic of a proppant slurry system in accordance with certain embodiments of the present disclosure.
Figure 2:
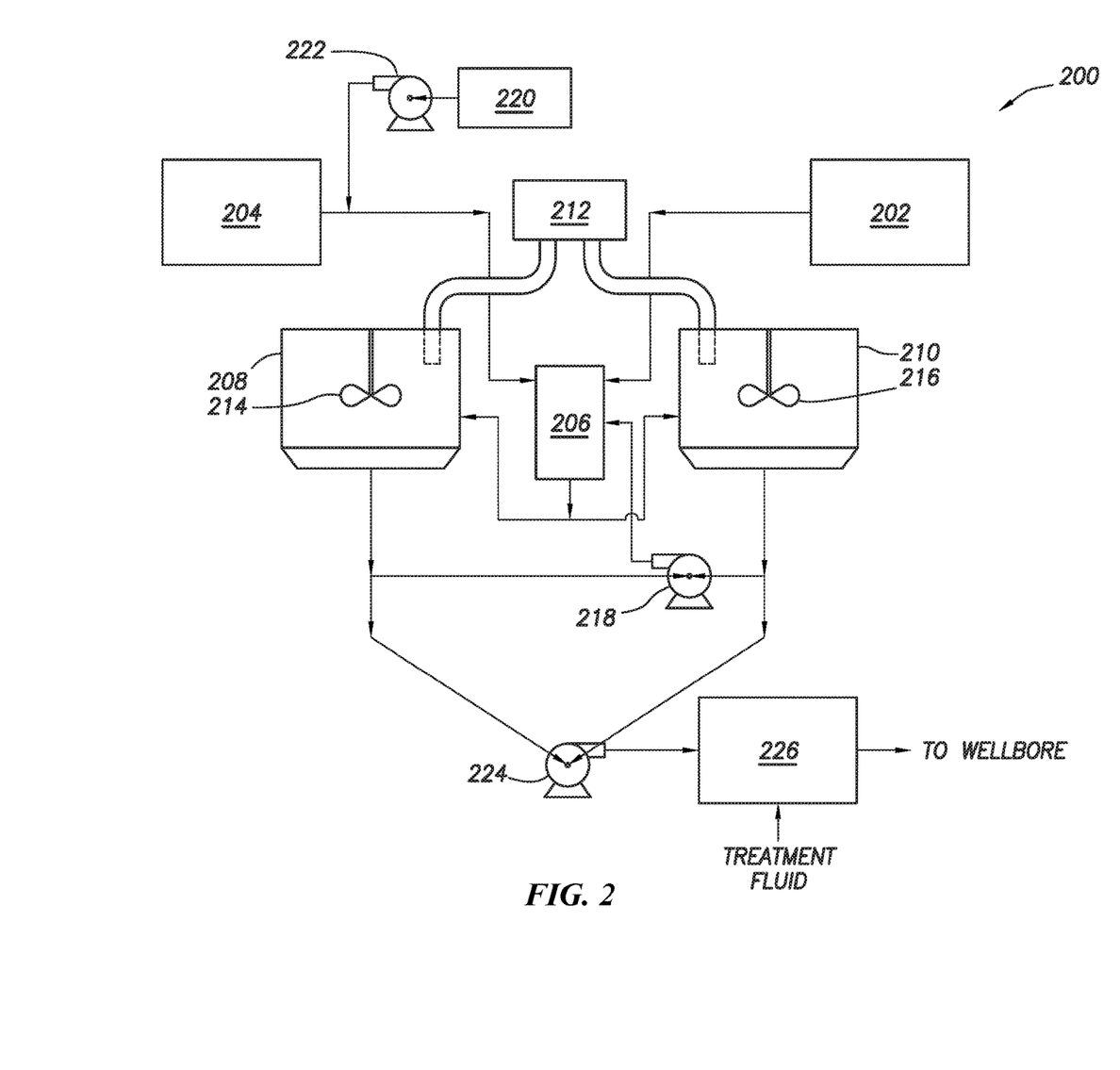
FIG. 2 is a schematic of a proppant slurry system in accordance with certain embodiments of the present disclosure.
Figure 3:
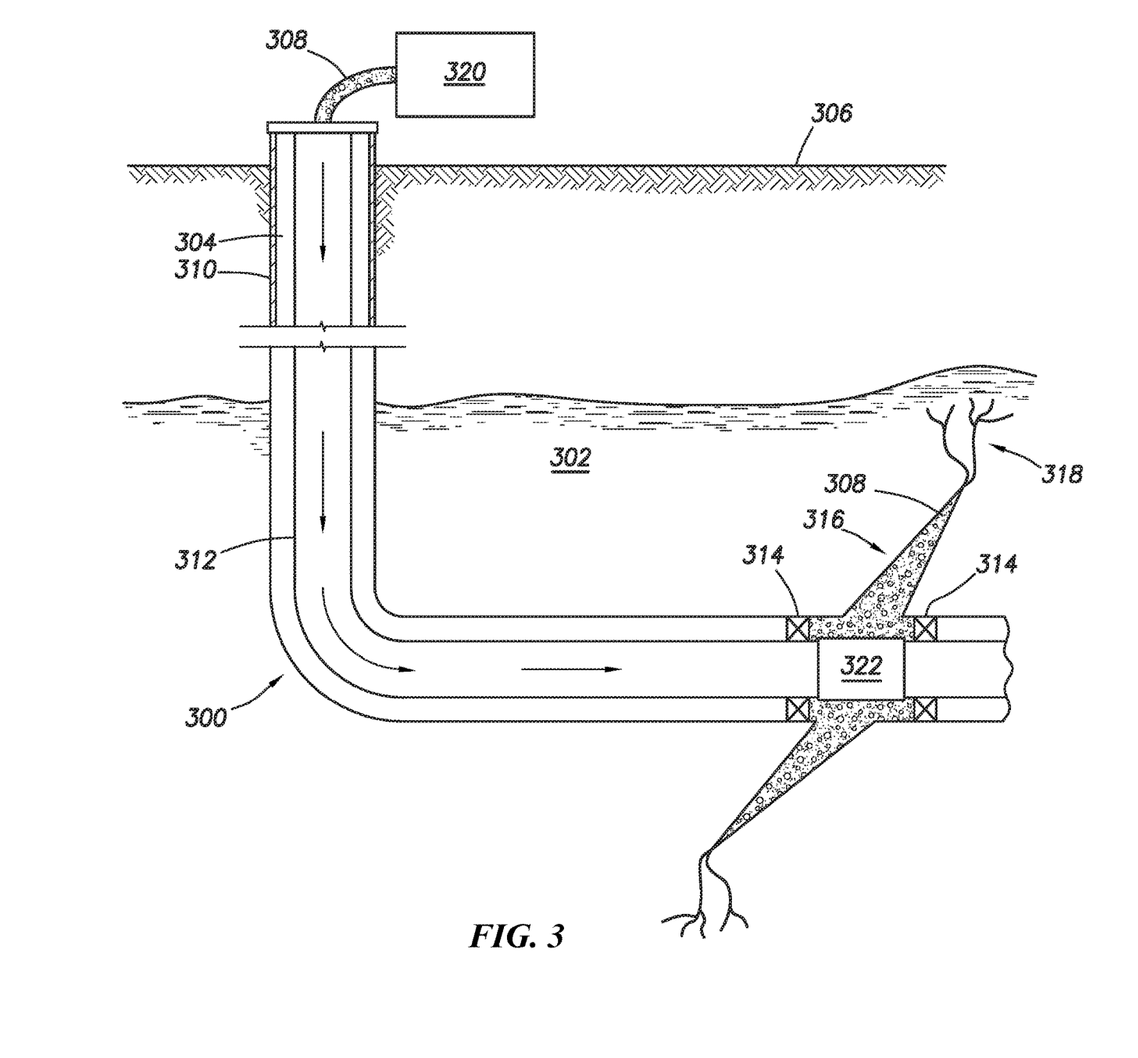
FIG. 3 is a diagram illustrating an example of a subterranean formation in which a fracturing operation may be performed in accordance with certain embodiments of the present disclosure.

Certain embodiments of the present disclosure and their advantages may be understood by referring to FIGS. 1 through 3. FIG. 1 depicts a proppant slurry system 100 in accordance with certain embodiments of the present disclosure. Proppant slurry system 100 may comprise a first tank 102 comprising proppant particulates, a second tank 104 comprising a base fluid, a mixer 106, a mixing tank 108, and a dust extractor 110.

In certain embodiments, proppant particulates from first tank 102 and base fluid from second tank 104 may be at least partially combined using mixer 106 to form a slurry. As used herein, the term "combine" and grammatical variations thereof include actions such as combining, mixing, incorporating, stirring, agitating, blending, and/or the like, to any degree. In certain embodiments, mixer 106 may comprise a jet mixer (as shown in FIG. 1), a recirculating cement mixer, or any other suitable mixer known in the art. In certain embodiments, mixer 106 may comprise a jet mixer having a pipe 112 and a base fluid inlet 114. In such embodiments, the proppant particulates may be transferred from first tank 102 to mixing tank 108 via pipe 112, and base fluid from second tank 104 may be introduced into pipe 112 at base fluid inlet 114. In such embodiments, base fluid inlet 114 may comprise one or more jets (not shown) through which base fluid may be discharged such that its velocity increases to enable combination with proppant particulates in pipe 112.

The proppant particulates may be transferred from first tank 102 to pipe 112 and/or mixing tank 108 pneumatically, with the assistance of gravity, and/or using one or more pumps (not shown). In certain embodiments, base fluid may be transferred from second tank 104 into pipe 112 using one or more pumps. In certain embodiments, the base fluid may be introduced into pipe 112 at base fluid inlet 114 with a sufficient pressure drop to increase the velocity of the base fluid flowing into pipe 112 such that the proppant particulates are at least partially combined with the base fluid to form a slurry. In certain embodiments, the slurry may be transferred to and/or deposited into mixing tank 108.

Although depicted as being located outside mixing tank 108, mixer 106 may be located within mixing tank 108. For instance, mixer 106 may comprise one or more jets or nozzles located within mixing tank 108 through which base fluid from second tank 104 is introduced into mixing tank 108. In such embodiment, proppant particulates from first tank 102 may be introduced into mixing tank 108 pneumatically, with the assistance of gravity, and/or using one or more pumps. The proppant particulates may be contacted with base fluid from the jets or nozzles located within mixing tank 108 such that the proppant particulates and base fluid at least partially combine to form a slurry in mixing tank 108.

In certain embodiment, mixing tank 108 may include a mixing device 116 that stirs the slurry and/or further combines the components of the slurry while disposed within mixing tank 108. Mixing device 116 may be any suitable mixing device known in the art including, but not limited to, a paddle stirrer, one or more jets, a static mixing device (e.g., chain in a pipe), a centrifugal mixing device, and any combination thereof. In certain embodiments, proppant slurry system 100 may include a recirculation pump 118 that recirculates slurry throughout mixing tank 108. In some embodiments, the slurry may travel from mixing tank 108 through recirculation pump 118 and mixer 106 before returning to mixing tank 108 as depicted in FIG. 1. In other embodiments, the slurry may travel from mixing tank 108 through recirculation pump 118 before returning to mixing tank 108 without traveling through mixer 106.

In certain embodiments, dust may be generated from the proppant particulates and entrapped within mixing tank 108 which may be enclosed with a lid. In such embodiments, dust may rise to the top of mixing tank 108. Dust may be generated during various steps in the methods of the present disclosure, for instance, upon combining the proppant particulates and the base fluid in mixer 106 and/or upon stirring the slurry and/or further combining the components of the slurry in mixing tank 108. As shown in FIG. 1, dust extractor 110 may be operative coupled to mixing tank 108 to extract or remove dust from mixing tank 108. In certain embodiments, dust extractor 110 may comprise a device that causes negative pressure or suction (e.g., a fan, a pump, a diaphragm device, a screw, a piston compressor, and the like) to aid in the extraction or removal of dust from mixing tank 108.

Proppant slurry system 100 may further comprise an additive storage unit 120 and/or an additive pump 122. Although only one additive storage unit is depicted in FIG. 1, proppant slurry systems of the present disclosure may comprise any number of additive storage units. In certain embodiments, one or more additives from additive storage unit 120 may be combined with the proppant particulates and the base fluid to form the slurry. In some embodiments, one or more additives from additive storage unit 120 may be introduced directly into mixing tank 108 as shown in FIG. 1. In other embodiments, one or more additives from additive storage unit 120 may be introduced into mixer 106. In such embodiments, one or more additives may be introduced into pipe 112. In yet other embodiments, one or more additives from additive storage unit 120 may be combined with base fluid from the second tank 104 before the base fluid is introduced into pipe 112 at base fluid inlet 114. Additive pump 122 may aid in the transferring of one or more additives from additive storage unit 120 to the desire destination (e.g., mixing tank 108, mixer 106, and/or the base fluid outlet from second tank 104). Proppant slurry system 100 also may comprise one or more engines 124, compressors, motors, or other equipment to necessary to operate the various equipment in proppant slurry system 100, such as pumps 118, 122 and mixing device 116.

FIG. 2 depicts a proppant slurry system 200 in accordance with certain embodiments of the present disclosure. Proppant slurry system 200 may comprise a first tank 202 comprising proppant particulates, a second tank 204 comprising a base fluid, a mixer 206, a first mixing tank 208, a second mixing tank 210, and a dust extractor 212. In certain embodiments, first tank 202 comprising proppant particulates may be transported to a well site. The proppant particulates may be transferred from first tank 202 to mixer 206 pneumatically, with the assistance of gravity, and/or using one or more pumps (not shown). Base fluid may be transferred from second tank 204 to mixer 206 with the assistance of gravity and/or using one or more pumps (not shown).

In certain embodiments, the proppant particulates and the base fluid may be at least partially combined in mixer 206 to form a slurry. Mixer 206 may comprise a jet mixer, a recirculating cement mixer, or any other suitable mixer known in the art. In certain embodiments, the slurry from mixer 206 may be transferred, deposited, or the like into first mixing tank 208, second mixing tank 210, or both. In certain embodiments, the slurry may be transferred from mixer 206 to first mixing tank 208 until first mixing tank 208 is full as which time the slurry may be transferred from mixer 206 to second mixing tank 210. In other embodiments, the slurry may be transferred from mixer 206 to both first mixing tank 208 and second mixing tank 210 at the same time. Although FIG. 2 depicts proppant slurry system 200 as having one mixer 206 and two mixing tanks 208, 210, the proppant slurry systems of the present disclosure may any number and combination of mixers and mixing tanks.

In certain embodiment, first mixing tank 208 and second mixing tank 210 may each include a mixing device 214, 216 that stirs the slurry and/or further combines the components of the slurry while disposed within first mixing tank 208 and second mixing tanks 210, respectively. Mixing devices 214, 216 may be any suitable mixing device known in the art including, but not limited to, a paddle stirrer, one or more jets, a static mixing device (e.g., chain in a pipe), a centrifugal mixing device, and any combination thereof. In certain embodiments, proppant slurry system 200 may include a recirculation pump 214. In such embodiments, for example, when mixer 206 comprises a recirculating cement mixer, slurry from first mixing tank 208, second mixing tank 210, mixer 206, or any combination thereof may be recirculated through mixer 206 using recirculation pump 218 and transferred into first mixing tank 208 and/or second mixing tank 210.

In certain embodiments, dust may be generated from the proppant particulates and entrapped within first mixing tank 208 and/or second mixing tank 210, which each may be enclosed with a lid. In such embodiments, dust may rise to the top of first mixing tank 208 and/or second mixing tank 210. Dust may be generated during various steps in the methods of the present disclosure, for instance, upon combining the proppant particulates and the base fluid in mixer 206 and/or upon stirring the slurry and/or further combining the components of the slurry in first mixing tank 208 and/or second mixing tank 210. As shown in FIG. 2, dust extractor 212 may be operative coupled to first mixing tank 208 and/or second mixing tank 210 to extract or remove dust from first mixing tank 208 and/or second mixing tank 210, respectively. In certain embodiments, dust extractor 212 may comprise a device that causes negative pressure or suction (e.g., a fan, a pump, a diaphragm device, a screw, a piston compressor, and the like) to aid in the extraction or removal of dust from first mixing tank 208 and/or second mixing tank 210. Although FIG. 2 depicts proppant slurry system 200 as having only one dust extractor 212, the proppant slurry systems of the present disclosure may comprise any number of dust extractors, for instance, one dust extractor for each mixing tank.

Proppant slurry system 200 may further comprise an additive storage unit 220 and/or an additive pump 222. Although only one additive storage unit is depicted in FIG. 2, the proppant slurry systems of the present disclosure may comprise any number of additive storage units. In certain embodiments, one or more additives from additive storage unit 220 may be combined with the proppant particulates and the base fluid to form the slurry. In some embodiments, one or more additives from additive storage unit 220 may be introduced directly into first mixing tank 208 and or second mixing tank 210. In other embodiments, one or more additives from additive storage unit 220 may be introduced into mixer 206. In yet other embodiments, one or more additives from additive storage unit 220 may be combined with base fluid from the second tank 204 before the base fluid is introduced into mixer 206 as shown in FIG. 2. Additive pump 222 may aid in the transferring of one or more additives from additive storage unit 220 to the desire destination (e.g., first mixing tank 208, second mixing tank 210, mixer 206, and/or the base fluid outlet from second tank 204). Although not depicted in FIG. 2, proppant slurry system 200 also may comprise one or more engines, compressors, motors, or other equipment to necessary to operate the various equipment in proppant slurry system 200, such as pumps 218, 222, mixer 206, and mixing devices 214, 216.

First tanks 102, 202, second tanks 104, 204, and additive storage units 120, 220 used in various embodiments of the present disclosure may comprise any tank or vessel known in the art for holding proppant particulates, base fluid (e.g., water), and additives, respectfully. Examples of such tanks and vessels that may be suitable for use in certain embodiments of the present disclosure include, but not limited to, first tanks, frac tanks, totes, drums, ISO or intermodal containers, and any combination thereof.

The base fluid used in the slurries of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous base fluids that may be suitable for use in the methods and systems of the present disclosure may comprise water from any source. Such aqueous base fluids may comprise fresh water, salt water (e.g., water containing one or more salts dissolved therein), brine (e.g., saturated salt water), seawater, or any combination thereof. In most embodiments of the present disclosure, the aqueous base fluids comprise one or more ionic species, such as those formed by salts dissolved in water. For example, seawater and/or produced water may comprise a variety of divalent cationic species dissolved therein. In certain embodiments, the density of the aqueous base fluid can be adjusted, among other purposes, to provide additional particulate transport and suspension in the compositions of the present disclosure. In certain embodiments, the pH of the aqueous base fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous base fluids that may be suitable for use in the methods and systems of the present disclosure include, but are not limited to oils, hydrocarbons, organic liquids, and the like. In certain embodiments, the slurries of the present disclosure may comprise a mixture of one or more fluids and/or gases, including but not limited to emulsions, foams, and the like.

Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metal-silicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the proppant particulates may be micro-size and/or nano-sized particulates having a mean particulate diameter in a range from about 0.01 micrometers to about 250 micrometers. In one or more embodiments, the proppant particulates may have a mean particulate diameter in a range from about 0.01 micrometers to about 100 micrometers. In one or more embodiments, the proppant particulates may have a mean particulate diameter in a range from about 0.01 micrometers to about 50 micrometers. In certain embodiments, the proppant particulates may have a mean particulate diameter of about 250 micrometers or less, in other embodiments, a particulate diameter of about 100 micrometers or less, in other embodiments, a mean particulate diameter of about 50 micrometers or less, in other embodiments, a mean particulate diameter of about 25 micrometers or less, in other embodiments, a mean particulate diameter of about 10 micrometers or less, and in other embodiments, a mean particulate diameter of about 5 micrometers or less.

In certain embodiments, each of the proppant particulates may have particulate sizes smaller than 100 mesh (149 micrometers), and in certain embodiments may have particulate sizes equal to or smaller than 200 mesh (74 micrometers), 230 mesh (63 micrometers), or even 325 mesh (44 micrometers). The size and/or diameter of the proppant particulates may be tailored for a particular application based on, for example, the estimated width of one or more microfractures within a subterranean formation in which the proppant particulates are to be used, as well as other factors.

As used herein, the term "diameter" with reference to a proppant particulate refers to a straight line segment joining two points on the outer surface of the proppant particulate and passing through the central region of the proppant particulate, but does not imply or require that the proppant particulate is spherical in shape or that it have only one diameter. As used herein, the term "mean particulate diameter" with reference to a proppant particulate refers to the sum of the diameter of each proppant particulate in the proppant particulates divided by the total number of the proppant particulates. The mean particulate diameter of the proppant particulates may be determined using any particulate size analyzer known in the art, for example, a Malvern Particle Size Analyzer, available from Malvern Instruments Ltd., of Worcestershire, UK. In certain embodiments, the mean particulate diameter of the proppant particulates may be determined using a representative subset or sample of proppant particulates from the proppant particulates. A person of skill in the art with the benefit of the present disclosure will understand how to select such a representative subset or sample of proppant particulates from the proppant particulates.

In certain embodiments, the proppant particulates may be present in the slurries of the present disclosure in any amount that allows for the transfer and/or metering of the slurry through the components of the systems of the present disclosure. In certain embodiments, the proppant particulates may be present in the slurries of the present disclosure in an amount up to about 90% by weight of the slurry, in other embodiments, in an amount up to about 80% by weight of the slurry, in other embodiments, in an amount up to about 70% by weight of the slurry, in other embodiments, in an amount up to about 60% by weight of the slurry, in other embodiments, in an amount up to about 50% by weight of the slurry, and in other embodiments, in an amount up to about 40% by weight of the slurry. In certain embodiments, the proppant particulates may be present in the slurries of the present disclosure in an amount from about 10% to about 90% by weight of the slurry. In other embodiments, the proppant particulates may be present in the slurries of the present disclosure in an amount from about 40% to about 80% by weight of the slurry. In other embodiments, the proppant particulates may be present in the slurries of the present disclosure in an amount from about 50% to about 70% by weight of the slurry.

In certain embodiments, the proppant slurry systems of the present disclose may comprise one or more devices for determining the density of the slurry and/or the concentration of the proppant particulates in the slurry. Such devices include, but are not limited to, a density meter, a flowmeter, a height sensor, and any combination thereof. Although not shown in FIGS. 1 and 2, the device(s) may be located in various positions in the proppant slurry systems of the present disclose, including, but not limited to, in the mixing tank, on the recirculation line from the mixing tank, and at the outlet of the mixer.

The additives used in the various embodiments of the present disclosure may be liquids, solids, and/or gels. Such additives include, but are not limited to, suspension agents, biocides, liquid gel concentrates, salts, additional surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, friction reducers, antifoam agents, bridging agents, flocculants, $H_2S$ scavengers, $CO_2$ scavengers, oxygen scavengers, lubricants, viscosifying/gelling agents, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the slurries of the present disclosure for a particular application.

In certain embodiments, one or more steps of the methods of the present disclosure may be performed at the well site. As used herein, the term "well site" refers to the physical location on which an oil or gas well is drilled and/or where the operation or treatment is conducted. The well site may range in size from a few thousand square feet to several acres. In certain embodiments, the slurry may be prepared at a well site, either by batch mixing or continuous ("on-the-fly") mixing. The term "on-the-fly" is used herein to include methods of combining two or more components wherein a flowing stream of one component is continuously introduced into a flowing stream of another component so that the streams are combined and mixed while continuing to flow as a single stream as part of the on-going treatment. Such mixing can also be described as "real-time" mixing.

In certain embodiments, one or more components of the proppant slurry systems of the present disclosure may be transported to a well site. In certain embodiments, one or more components of the proppant slurry systems of the present disclosure may be mounted on a skid, trailer, or other transportation device to facility transportation to the well site. For example, referring back to FIG. 1, first tank 102 and mixing tank 108 are shown mounted on a trailer 126. In certain embodiments, the proppant slurry systems of the present disclosure may be located at the well site, and one or more of the components of the slurry (e.g., proppant particulates, base fluid, or additives) may be transported to the well site and used in the proppant slurry systems of the present disclosure to prepare slurry in accordance with the methods described herein. For example, as shown in FIG. 1, a supply vessel 132 (e.g., a pneumatic bulk material transport) may be utilized to transport proppant particulates to the well site, and proppant particulates from supply vessel 132 may be transferred to first tank 102 to prepare slurry in accordance with the methods described herein. In such embodiments, an unlimited quantity of slurry may be produced "on the fly." In such embodiments, the proppant particulates may be dry (i.e., free from any liquid) during transport. In some embodiments, the proppant particulates may be in a dry powder form during transport.

Referring to FIGS. 1 and 2, the proppant slurry systems 100, 200 of the present disclosure may comprise one or more transfer pumps 128, 224 and/or one or more blenders 130, 226. In certain embodiments, the transfer pump(s) 128, 224 may be used to transfer the slurry from the mixing tanks 108, 208, 210 to the blender(s) 130, 226. Although FIGS. 1 and 2 each depict only one transfer pump 128, 224 and one blender 130, 226, the proppant slurry systems of the present disclosure may comprise any number and combination of transfer pumps and blenders. In certain embodiments, the slurry may be combined with a treatment fluid in blender 130, 226, and the treatment fluid may be transferred from blender 130, 226 to a wellbore penetrating at least a portion of a subterranean formation. In certain embodiments, the treatment fluid may be transferred from blender 130, 226 to the wellbore using various equipment not illustrated in FIG. 1 or 2, including, but not limited to, conduits, pipelines, tubulars, pipes, valves, pumps, compressors, motors, and any combination thereof.

The treatment fluids that may be useful in accordance with the present disclosure may comprise any base fluid known in the art, including aqueous base fluids, non-aqueous base fluids, and any combinations thereof. The treatment fluids used in accordance with the methods of the present disclosure optionally may comprise any number of additives. Examples of such additives include, but are not limited to, salts, surfactants, acids, diverting agents, fluid loss control additives, tracking chemicals, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, sealants, resins, wetting agents, coating enhancement agents, filter cake removal agents, antifreeze agents (e.g., ethylene glycol), and the like. Such additives also may affect the selection of a surfactant as such additives may have an effect on the characteristics of the treatment fluid.

In certain embodiments, the slurries of the present disclosure may be combined with the treatment fluids of the present disclosure such that the proppant particulates are present in the treatment fluids in an amount up to about 23 pounds of proppant particulates per gallon of treatment fluid ("ppg"). In certain embodiments, the proppant particulates may be present in the treatment fluids of the present disclosure in an amount within a range from about 0.01 ppg to about 23 ppg. In one or more embodiments, the proppant particulates may be present in the treatment fluids of the present disclosure in an amount within a range from about 0.01 ppg to about 0.1 ppg, in other embodiments, from about 0.1 ppg to about 1 ppg, in other embodiments, from about 1 ppg to about 2 ppg, in other embodiments, from about 2 ppg to about 3 ppg, in other embodiments, from about 3 ppg to about 4 ppg, in other embodiments, from about 4 ppg to about 5 ppg, in other embodiments, from about 5 ppg to about 6 ppg, in other embodiments, from about 6 ppg to about 7 ppg, in other embodiments, from about 7 ppg to about 8 ppg, in other embodiments, from about 8 ppg to about 9 ppg, and in other embodiments, from about 9 ppg to about 10 ppg. In one or more embodiments, the proppant particulates may be present in the treatment fluids of the present disclosure in an amount within a range from about 0.01 ppg to about 5 ppg, in other embodiments, from about 5 ppg to about 10 ppg, in other embodiments, from about 10 ppg to about 15 ppg, in other embodiments, from about 15 ppg to about 20 ppg, and in other embodiments, from about 20 ppg to about 23 ppg. In certain embodiments, the proppant particulates may be present in the treatment fluids of the present disclosure in an amount within a range from about 0.01 ppg to about 0.5 ppg. In one or more embodiments, the proppant particulates may be present in the treatment fluids of the present disclosure in an amount within a range from about 0.01 ppg to about 0.05 ppg, in other embodiments, from about 0.05 ppg to about 0.1 ppg, in other embodiments, from about 0.1 ppg to about 0.2 ppg, in other embodiments, from about 0.2 ppg to about 0.3 ppg, in other embodiments, from about 0.3 ppg to about 0.4 ppg, and in other embodiments, from about 0.4 ppg to about 0.5 ppg. The concentration of the proppant particulates in the treatment fluid may vary depending on the particular application of the treatment fluid (e.g., pre-pad fluid, pad fluid, or spacer fluid).

FIG. 3 shows a well 300 during a fracturing operation in a portion of a subterranean formation of interest 302 surrounding a wellbore 304. The wellbore 304 extends from the surface 306, and the treatment fluid 308 is applied to a portion of the subterranean formation 302 surrounding the horizontal portion of the wellbore. Although shown as vertical deviating to horizontal, the wellbore 304 may include horizontal, vertical, slant, curved, and other types of wellbore geometries and orientations, and the fracturing treatment may be applied to a subterranean zone surrounding any portion of the wellbore. The wellbore 304 can include a casing 310 that is cemented or otherwise secured to the wellbore wall. The wellbore 304 can be uncased or include uncased sections. Perforations can be formed in the casing 310 to allow fracturing fluids and/or other materials to flow into the subterranean formation 302. In cased wells, perforations can be formed using shape charges, a perforating gun, hydro-jetting and/or other tools.

The well is shown with a work string 312 depending from the surface 306 into the wellbore 304. A pump and blender system 320, which may include blender 130 in FIG. 1 or blender 226 in FIG. 2, is coupled a work string 312 to pump the treatment fluid 308 into the wellbore 304. The working string 312 may include coiled tubing, jointed pipe, and/or other structures that allow fluid to flow into the wellbore 304. The working string 312 can include flow control devices 322 (e.g., bypass valves, ports, and or other tools or well devices) that control a flow of fluid from the interior of the working string 312 into the subterranean zone 302. For example, the working string 312 may include ports adjacent the wellbore wall to communicate a treatment fluid 308 (e.g., fracturing fluid, pad fluids, pre-pad fluids, spacer fluids, as well as other fluids) directly into the subterranean formation 302, and/or the working string 312 may include ports that are spaced apart from the wellbore wall to communicate treatment fluid 308 and/or other fluids into an annulus in the wellbore between the working string 312 and the wellbore wall. The working string 312 and/or the wellbore 304 may include one or more sets of packers 314 that seal the annulus between the working string 312 and wellbore 304 to define an interval of the wellbore 304 into which a treatment fluid 308 or other fluids will be pumped. FIG. 3 shows two packers 314, one defining an uphole boundary of the interval and one defining the downhole end of the interval.

In certain embodiments, the treatment fluid 308 may be introduced into the wellbore 304 at or above at or above a certain hydraulic pressure. In such embodiments, when the treatment fluid 308 (e.g., a fracturing fluid) is pumped into the desired interval of the wellbore 304 at or above a certain hydraulic pressure, the rock of the subterranean zone 302 "fractures," in that one or more fractures or cracks are created in the zone or one or more existing fractures or cracks in the zone 302 are enlarged or enhanced. In the embodiments shown, the rock matrix of the subterranean zone 302 is of a type that, when fractured, produces both a primary fracture 316 in the near field and secondary fractures 318 (e.g., induced, dendritic fractures or microfractures) in the far field. The secondary fractures 318 have propagated from or near the ends and edges of the primary fracture 316. In certain instances, the subterranean zone 302 is a low permeability zone having a permeability of 1 mD or less. For example, the subterranean zone 302 can include a shale, tight gas, clay, and/or coal bed formation. In certain instances, the rock matrix of the subterranean zone 302 may include cleating or natural fractures (i.e., those that existed prior to, and were not caused by, a fracture treatment). The natural fractures tend to run generally in a direction that is parallel to the primary fracture 316. The secondary fractures 318 run in many directions including directions non-parallel and, in certain instances, perpendicular to the direction of the primary fracture 316. As a result, the secondary fracture 318 can cross, and thereby link, the natural fractures to the primary fracture 316. In certain embodiments, the proppant particulates in the treatment fluid 308 may enter and/or be deposited within one or more of the primary fracture 316 and/or the secondary fractures 308.

An embodiment of the present disclosure is a method including: combining proppant particulates and a base fluid at a well site to form a slurry; and extracting dust from a mixing tank at a well site in which the slurry is disposed.

Another embodiment of the present disclosure is a method including: transporting a first tank containing proppant particulates to a well site, wherein the proppant particulates are dry during transport; combining at least a portion of the proppant particulates from the first tank with a base fluid at the well site to form a slurry; and extracting dust generated from the proppant particulates at the well site.

Another embodiment of the present disclosure is a system including: a first tank containing proppant particulates located at a wellsite; a second tank containing a base fluid located at a well site; at least one mixer operable to receive and mix at least a portion of the proppant particulates from the first tank and at least a portion of the base fluid from the second tank at the well site to form a slurry; at least one mixing tank operable to receive the slurry from the mixer; at least one dust extractor operable to extract dust from the at least one mixing tank; and at least one blender operable to receive the slurry from the mixer and add the slurry to a treatment fluid; and at least one pump operable to transfer the treatment fluid to a wellbore penetrating at least a portion of a subterranean formation located at the well site.

What is claimed is:

1. A method comprising:
combining proppant particulates and a base fluid using a mixer at a well site to form a slurry;
transferring the slurry to a mixing tank;
extracting dust from the mixing tank at the well site in which the slurry is disposed;
transferring the slurry from the mixing tank to a blender through a pipe coupled to the mixing tank and the blender; and
combining the slurry with a treatment fluid in the blender.

2. The method of claim 1, further comprising pneumatically transferring the proppant particulates to the at least one mixer at the well site.

3. The method of claim 1 further comprising transporting the proppant particulates to the well site, wherein the proppant particulates are dry during transport.

4. The method of claim 1 further comprising recirculating the slurry throughout the mixing tank.

5. The method of claim 1 further comprising combining one or more additives with the proppant particulates and the base fluid to form the slurry.

6. The method of claim 1 further comprising
introducing the treatment fluid into a wellbore penetrating at least a portion of a subterranean formation located at the well site.

7. A method comprising:
transporting a first tank containing proppant particulates to a well site, wherein the proppant particulates are dry during transport;
combining at least a portion of the proppant particulates from the first tank with a base fluid at the well site;
mixing the portion of the proppant particulates and the base fluid using a mixer at the well site to form a slurry;
transferring the slurry to a mixing tank at the well site;
extracting dust from the mixing tank generated from the proppant particulates at the well site; and
transferring the slurry from the mixing tank to a blender through a pipe coupled to the mixing tank and the blender.

8. The method of claim 7, further comprising transporting the first tank to the well site with at least one of a mixer and a mixing tank.

9. The method of claim 7, further comprising transferring the portion of the proppant particulates to the at least one mixer pneumatically.

10. The method of claim 7, wherein the proppant particulates have an average particulate size from about 0.01 micrometer to about 250 micrometers.

11. The method of claim 7, wherein the slurry is disposed in a mixing tank, and the method further comprises:
combining the slurry with a treatment fluid in the blender; and introducing the treatment fluid into a wellbore penetrating at least a portion of a subterranean formation located at the well site.

12. A system comprising:

a first tank containing proppant particulates located at a well site;

a second tank containing a base fluid located at a well site;

at least one mixer operable to receive and mix at least a portion of the proppant particulates from the first tank and at least a portion of the base fluid from the second tank at the well site to form a slurry;

at least one mixing tank operable to receive the slurry from the mixer;

at least one dust extractor operable to extract dust from the at least one mixing tank;

at least one pipe coupled to the at least one mixing tank and at least one blender to transfer the slurry from the at least one mixing tank to the at least one blender;

the at least one blender operable to receive the slurry from the mixing tank and add the slurry to a treatment fluid; and at least one pump operable to transfer the treatment fluid to a wellbore penetrating at least a portion of a subterranean formation located at the well site.

13. The system of claim 12 further comprising at least one additive storage unit located at the well site, wherein the at least one mixer is operable to receive and mix at least one additive from the additive storage unit with the proppant particulates and the base fluid.

14. The system of claim 12 further comprising at least one additive storage unit located at the well site, wherein the at least one mixing tank is operable to receive and mix at least one additive from the additive storage unit with the slurry.

15. The system of claim 12 further comprising one or more devices for measuring density or concentration of the slurry operatively coupled to the at least one mixer.

16. The system of claim 12, wherein the mixing tank comprises a mixing device.

17. The system of claim 12, wherein the at least one mixer is a jet mixer or a recirculating mixer.

18. The system of claim 12, further comprising at least one pump operable to transfer the slurry from the at least one mixing tank to the at least one blender.

* * * * *